(12) United States Patent
Gokhale et al.

(10) Patent No.: US 10,475,324 B2
(45) Date of Patent: *Nov. 12, 2019

(54) HVAC SYSTEM AND AN HVAC CONTROLLER CONFIGURED TO GENERATE MASTER SERVICE ALARMS

(71) Applicant: Lennox Industries Inc., Richardson, TX (US)

(72) Inventors: Umesh Gokhale, Carrollton, TX (US); Jon Douglas, Carrollton, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/254,668

(22) Filed: Jan. 23, 2019

(65) Prior Publication Data
US 2019/0156649 A1    May 23, 2019

Related U.S. Application Data

(63) Continuation of application No. 14/862,403, filed on Sep. 23, 2015, now Pat. No. 10,192,422.
(Continued)

(51) Int. Cl.
*G08B 21/18* (2006.01)
*G08B 25/08* (2006.01)
(Continued)

(52) U.S. Cl.
CPC ............ *G08B 21/182* (2013.01); *F24F 11/30* (2018.01); *F24F 11/62* (2018.01); *G05B 15/02* (2013.01); *G08B 25/08* (2013.01); *F24F 11/32* (2018.01); *F24F 11/52* (2018.01); *F24F 11/56* (2018.01); *F24F 2110/10* (2018.01); *F24F 2110/12* (2018.01); *G05B 2219/2614* (2013.01); *G05B 2219/2642* (2013.01); *G05B 2219/31437* (2013.01)

(58) Field of Classification Search
None
See application file for complete search history.

(56) References Cited

U.S. PATENT DOCUMENTS 4,442,972 A    4/1984 Sahay et al.
4,574,871 A    3/1986 Parkinson et al.
(Continued)

OTHER PUBLICATIONS

Capitol Engineering Company, "HVAC Monitoring Service," http://www.capitol-eng.com/hvacmonitoring.asp,Jan. 2009, 1 page.

*Primary Examiner* — Chico A Foxx
(74) *Attorney, Agent, or Firm* — Winstead PC

(57) ABSTRACT

A method of generating an alarm based on temperature conditions within an enclosed space. The method includes receiving, by a processor of a heating, ventilation, and air conditioning (HVAC) system, operating-condition information of the HVAC system, determining, by the processor from the received operating-condition information, whether temperature within the enclosed space is approaching a setpoint temperature. Responsive to a determination that the temperature within the enclosed space has failed to approach the setpoint temperature, determining by the processor, whether anomaly conditions exist and responsive to a determination that the anomaly conditions do not exist, generating the alarm.

18 Claims, 4 Drawing Sheets

Related U.S. Application Data

(60) Provisional application No. 62/104,542, filed on Jan. 16, 2015.

(51) Int. Cl.
  F24F 11/30 (2018.01)
  G05B 15/02 (2006.01)
  F24F 11/62 (2018.01)
  F24F 110/10 (2018.01)
  F24F 110/12 (2018.01)
  F24F 11/32 (2018.01)
  F24F 11/56 (2018.01)
  F24F 11/52 (2018.01)

(56) References Cited

U.S. PATENT DOCUMENTS

| | | | |
|---|---|---|---|
| 4,949,551 A | 8/1990 | Gregory | |
| 5,305,953 A | 4/1994 | Rayburn et al. | |
| 5,481,481 A | 1/1996 | Frey et al. | |
| 5,684,463 A * | 11/1997 | Diercks | F24F 11/0086 340/584 |
| 6,064,310 A | 5/2000 | Busak et al. | |
| 6,067,498 A | 5/2000 | Akiyama | |
| 6,215,405 B1 | 4/2001 | Handley et al. | |
| 6,334,317 B1 | 1/2002 | Bougauchi et al. | |
| 6,955,302 B2 | 10/2005 | Erdman, Jr. | |
| 7,801,646 B2 | 9/2010 | Amundson et al. | |
| 8,463,442 B2 | 6/2013 | Curry et al. | |
| 8,655,491 B2 | 2/2014 | Hadzidedic et al. | |
| 8,713,697 B2 | 4/2014 | Courtney et al. | |
| 8,914,300 B2 | 12/2014 | Sustaeta et al. | |
| 9,002,523 B2 | 4/2015 | Erickson et al. | |
| 9,341,405 B2 | 5/2016 | Qu et al. | |
| 9,866,025 B2 * | 1/2018 | Winter | H02J 3/32 |
| 2002/0198990 A1 | 12/2002 | Bradfield et al. | |
| 2005/0268625 A1 | 12/2005 | Sienel et al. | |
| 2006/0173653 A1 | 8/2006 | Chian et al. | |
| 2007/0012052 A1 | 1/2007 | Butler et al. | |
| 2007/0194097 A1 | 8/2007 | Jones et al. | |
| 2009/0057428 A1 | 3/2009 | Geadelmann et al. | |
| 2009/0204232 A1 | 8/2009 | Guru et al. | |
| 2010/0070089 A1 | 3/2010 | Harrod et al. | |
| 2010/0102136 A1 | 4/2010 | Hadzidedic et al. | |
| 2010/0106316 A1 | 4/2010 | Curry et al. | |
| 2011/0031323 A1 * | 2/2011 | Nold | G05B 19/0428 236/20 R |
| 2012/0186274 A1 | 7/2012 | Cwiertniewicz et al. | |
| 2013/0158718 A1 | 6/2013 | Barton et al. | |
| 2013/0325190 A1 | 12/2013 | Imes et al. | |
| 2014/0150477 A1 | 6/2014 | Qu et al. | |
| 2014/0352340 A1 | 12/2014 | Berg et al. | |
| 2015/0204578 A1 | 7/2015 | Kaiser et al. | |
| 2015/0267935 A1 | 9/2015 | Devenish et al. | |
| 2016/0328945 A1 | 11/2016 | Greisser et al. | |
| 2017/0111210 A1 | 4/2017 | Chakrobartty et al. | |

\* cited by examiner

HVAC SYSTEM AND AN HVAC CONTROLLER CONFIGURED TO GENERATE MASTER SERVICE ALARMS

CROSS-REFERENCE TO RELATED APPLICATIONS

This Application is a continuation of U.S. patent application Ser. No. 14/862,403, filed on Sep. 23, 2015. U.S. patent application Ser. No. 14/862,403 is a non-provisional application claiming priority to U.S. Provisional Application No. 62/104,542 filed on Jan. 16, 2015. U.S. patent application Ser. No. 14/862,403 and U.S. Provisional Application No. 62/104,542 are incorporated herein by reference.

TECHNICAL FIELD

The present invention relates generally to heating, ventilation, and air conditioning (HVAC) systems and, more particularly, but not by way of limitation, to preserving comfort level of users employing the HVAC systems.

HISTORY OF RELATED ART

HVAC systems are used to regulate environmental conditions within an enclosed space. Typically, HVAC systems have a circulation fan that pulls air from the enclosed space through ducts and pushes the air back into the enclosed space through additional ducts after conditioning the air (e.g., heating, cooling, humidifying, or dehumidifying the air).

BRIEF SUMMARY OF THE INVENTION

A method of generating an alarm based on temperature conditions within an enclosed space. The method includes receiving, by a processor of a heating, ventilation, and air conditioning (HVAC) system, operating-condition information of the HVAC system, determining, by the processor from the received operating-condition information, whether temperature within the enclosed space is approaching a setpoint temperature. Responsive to a determination that the temperature within the enclosed space has failed to approach the setpoint temperature, determining by the processor, whether anomaly conditions exist and responsive to a determination that the anomaly conditions do not exist, generating the alarm.

A system includes a processor of a heating, ventilation, and air conditioning (HVAC) system and at least one server configured to communicate with the processor via a wireless network. The processor is configured to receive operating-condition information of the HVAC system, determine whether temperature within an enclosed space has approached a setpoint temperature, responsive to a determination that the temperature within the enclosed space has failed to approach the setpoint temperature, determine whether anomaly conditions exist and responsive to a determination that the anomaly conditions do not exist, generate an alarm.

DETAILED DESCRIPTION

Figure 1:
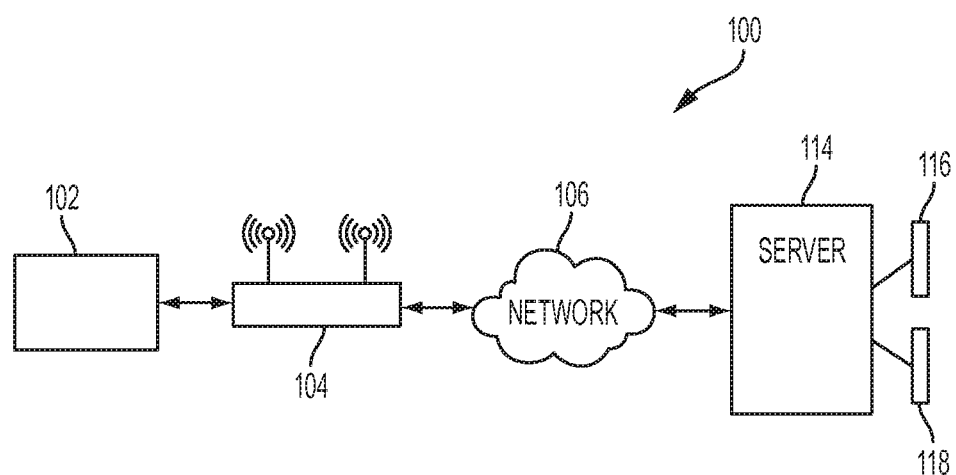
FIG. 1 is a schematic view illustrating a smart environment system.

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

To direct operations of the circulation fan and other components, each HVAC system includes at least one controller. In addition to directing the operation of the HVAC system, the at least one controller may also be used to monitor various components, also referred to as equipment, of the HVAC system to determine if the HVAC system components are functioning properly. Thus, the at least one controller can detect an occurrence of a service event and generate a service alarm. The service event may be, for example, a trigger of a service indicator or an expiration of a service event timer for a component of the HVAC system.

For example, the service event timer may indicate via a service alarm that an air filter of the HVAC system must be replaced. Even though the service event timer may indicate, for example, that the air filter needs replacement, the air filter may still have sufficient filtering capacity. A service alarm generated by the HVAC system relative to replacement of the air filter does not require a service call to a service provider. Additionally, for example, during winter months, heat pumps often go through a defrost cycle during operation. Upon detecting the defrost cycle, the HVAC system recognizes that ice has formed or begun to form and generates a service alarm. A service alarm generated by the HVAC system relative to the defrost cycle does not require a service call to a service provider.

In many prior systems. HVAC systems are programmed to generate service alarms if a system malfunction is detected. Oftentimes, the detected system malfunction is a do-it-yourself issue (e.g., filter replacement) or is an issue that the HVAC system automatically fixes (e.g., defrost cycle). Monitoring the HVAC system for service events and generating alarms based thereon may generate unnecessary service alarms that result in unnecessary service calls to service providers. Thus, it is important to distinguish alarms that truly indicate that the HVAC system needs service by the service provider from those that do not.

A user may not necessarily be concerned with a status of a particular component of the HVAC system but may instead only be interested to know whether the HVAC system can sufficiently condition air (e.g., heating, cooling, humidifying, or dehumidifying the air) for the user's comfort. As such, exemplary embodiments provide an HVAC system that generates a master service alarm if the HVAC system is not able to properly condition air under predefined operating conditions of the HVAC system ("conditioning operating conditions"). In a typical embodiment, a method, an HVAC system, and an HVAC controller are disclosed that do not send out alarms indicating the status of HVAC system components or send out alarms for HVAC system malfunctions that the HVAC system automatically fixes but instead communicates a master service alarm indicating that the HVAC system needs service only when the HVAC system is not able to properly condition air. In short, the master service alarm provides an indication that the HVAC system is not able to meet desired HVAC system operational parameters thereby causing a measurable loss of comfort and, thus, is in need of repair or service. Therefore, the master service alarm is generated only when a service call by a service provider is warranted and not in response to other detected service events of the HVAC system.

The conditioning operating conditions are not service event notifications from components of the HVAC system but instead are operating conditions or states employed by the HVAC system when conditioning air for an enclosed space. In some embodiments, the conditioning operating conditions may be, for example, an operating mode, a setpoint for the operating mode, a demand for the operating mode, indoor temperature of the enclosed space, and the like. The demand may be a demand for the HVAC system to condition the air such as, for example, a cooling demand or a heating demand. In a typical embodiment, a thermostat call is an example of the demand for the operating mode. Thus, the conditioning operating conditions are inputs, measurements, or states that can be provided by, for example, the thermostat. The operating mode is a conditioning mode of the HVAC system such as, for example, a heating mode or a cooling mode.

The HVAC system generates the master service alarm in response to a comfort violation. Comfort violation occurs when the HVAC system is not able to meet desired HVAC system operational parameters thereby causing a measurable loss of comfort and, thus, is in need of repair or service. For example, comfort violation occurs when a desired or expected temperature in the enclosed space is not achieved. In particular, when the indoor temperature is either above a cooling setpoint or below a heating setpoint and fails to approach the desired cooling setpoint or the desired heating setpoint, comfort violation occurs. For purpose of this patent application, a cooling setpoint or heating setpoint refers to a target temperature setting of the HVAC system as set by the user or an automatic target temperature setting based on a predefined schedule. Approaching the cooling setpoint occurs when the indoor temperature drops to reach the cooling setpoint or drops to reach the cooling setpoint within an acceptable range such as, for example, within 0.1 to 0.5 degrees of the cooling setpoint. Approaching the heating setpoint occurs when the indoor temperature rises to reach the heating setpoint or rises to reach the heating setpoint within an acceptable range such as, for example, within 0.1 to 0.5 degrees of the heating setpoint. The acceptable range can be based on various factors such as, for example, a type of the HVAC system, a model of the HVAC system, and the like.

FIG. 1 is a schematic view illustrating a smart environment system 100. The smart environment system 100 includes an HVAC system 102, a networking device 104, and at least one server or cloud-computing system 114. The networking device 104 and the at least one server or cloud-computing system 114 are each communicably coupled to a network 106. The network 106 can include any number of wired and/or wireless communications networks such as, for example, public or private intranets, a wide area network (e.g., the Internet), cellular networks, satellite communication, and the like.

In a typical embodiment, the networking device 104 serves as networking equipment that, for example, routes/forwards traffic between two or more networks or sub-networks and/or provides access to a network. For example, the networking device 104 allows the HVAC system 102 to communicate with the at least one server or cloud-computing system 114 via the network 106. In a typical embodiment, the networking device 104 can include, for example, routers, switches, bridges, hubs, wireless access points, gateways, a combination of same, and/or the like. In a typical embodiment, the networking device 104 is further configured to communicate with communication equipment such as, for example, routers, wireless hubs, access points, and the like. In a typical embodiment, the at least one server or cloud-computing system 114 may be associated with a manufacturer, a support entity, a service provider, and the like. The at least one server or cloud-computing system 114 is configured to communicate with a plurality of devices such as, for example, a monitoring device 116, a communication device 118, and the like.

In a typical embodiment, the monitoring device 116 is not part of the HVAC system 102. The monitoring device 116 is a server or computer of another party besides the user such as, for example, the manufacturer, the support entity, the service provider, and the like. Herein, a user of the HVAC system 102 refers collectively to a person that employs the HVAC system 102 to obtain comfort within the enclosed space and controls the thermostat of the HVAC system 102 or someone whose comfort is affected when a comfort violation occurs. For example, the user may be an owner of a home or a family member who lives in the home where the HVAC system 102 is situated. In some embodiments, the monitoring device 116 may be located remotely from the installed location of the HVAC system 102. In other embodiments, the monitoring device 116 may be located at an office of, for example, the manufacturer, the support entity, the service provider, and the like.

In a typical embodiment, the communication device 118 may be, for example, a non-HVAC device. A non-HVAC device as used herein is a device having a primary function that is not associated with HVAC systems. For example, non-HVAC devices include mobile computing devices that are configured to interact with the HVAC systems. Mobile computing devices may be, for example, a personal computer (e.g., desktop or laptop), tablet computer, mobile device (e.g., smart phone), and the like. In a typical embodiment, the communication device 118 includes at least one processor, memory and a user interface such as, for example, a display. One skilled in the art will also understand that the communication device 118 disclosed herein includes other components that are typically included in such devices including, for example, a power supply, communications interface, and the like. In some embodiments, the non-HVAC device may be, for example, a control console of an automobile.

Figure 2:
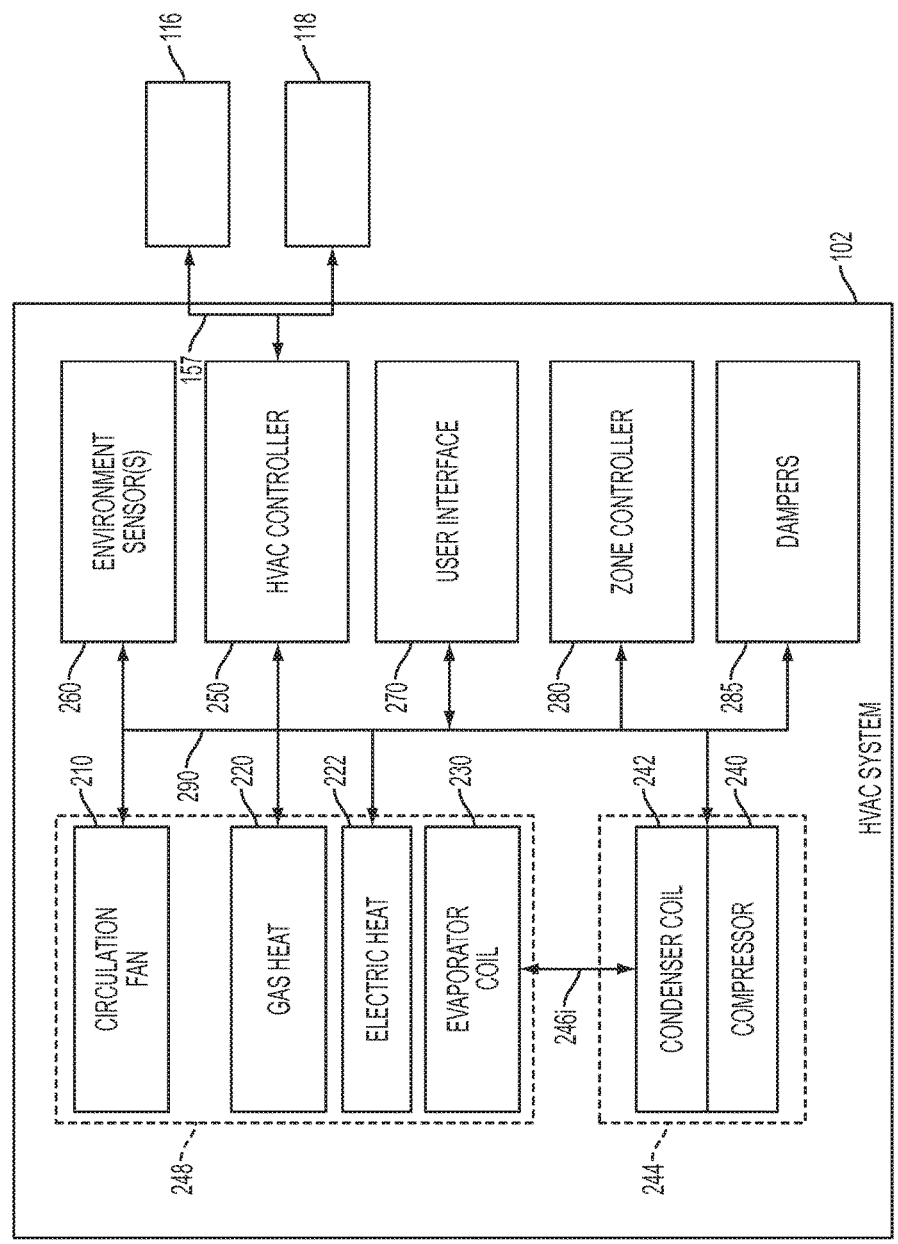
FIG. 2 illustrates an exemplary HVAC system.

FIG. 2 illustrates an exemplary HVAC system 102. For illustrative purposes, the HVAC system 102 will be described relative to FIGS. 1-2. The HVAC system 102 is a networked HVAC system configured to condition air (e.g., heating, cooling, humidifying, or dehumidifying the air) within the enclosed space. In a typical embodiment, the enclosed space may be, for example, a house, an office building, a warehouse, and the like. Thus, the HVAC system 102 can be a residential system or a commercial system such as, for example, a roof top system. For exemplary illustration, the HVAC system 102 as illustrated in FIG. 2 includes various components; however, in other embodiments, the HVAC system 102 may include additional components that are not illustrated but typically included within HVAC systems.

The HVAC system 102 includes a circulation fan 210, a gas heat 220, electric heat 222 typically associated with the circulation fan 210, and a refrigerant evaporator coil 230, also typically associated with the circulation fan 110. The circulation fan 210, the gas heat 220, the electric heat 222, and the refrigerant evaporator coil 230 are collectively referred to as an "indoor unit" 248. The HVAC system 102 also includes a compressor 240 and an associated condenser coil 242, which are typically referred to as an "outdoor unit" 244. The compressor 240 and the associated condenser coil 242 are typically connected to an associated evaporator coil 230 by a refrigerant line 246. The circulation fan 210, sometimes referred to as a blower, is configured to operate at different capacities (i.e., motor speeds) to circulate air through the HVAC system 102, whereby the circulated air is conditioned and supplied to the enclosed space.

The HVAC system 102 also includes an HVAC controller 250 that is configured to control operation of the various components of the HVAC system 102 such as, for example, the circulation fan 210, the gas heat 220, the electric heat 222, and the compressor 240 to regulate the environment of the enclosed space. In some embodiments, the HVAC system 102 can be a zoned system. As such, the HVAC system 102 may also include a zone controller 280, dampers 285, and a plurality of environment sensors 260. Accordingly, the HVAC controller 250 can also cooperate with the zone controller 280 and the dampers 285 to regulate the environment of the enclosed space.

The HVAC controller 250 may be an integrated controller or a distributed controller that directs operation of the HVAC system 102. In a typical embodiment, the HVAC controller 250 includes an interface (illustrated in FIG. 3 below) to receive, for example, thermostat calls, temperature setpoints, blower control signals, environmental conditions, and operating mode status for various zones of the HVAC system 102. For example, the environmental conditions include indoor temperature of the enclosed space. The HVAC controller 250 also includes a processor (illustrated in FIG. 3 below) to direct the operation of the HVAC system 102.

In some embodiments, the plurality of environment sensors 260 may be associated with the HVAC controller 250 and also optionally associated with a user interface 270. The plurality of environment sensors 260 provide environmental information within a zone or zones of the enclosed space such as, for example, temperature and humidity to the HVAC controller 250. The plurality of environment sensors 260 may also send the environmental information to a display of the user interface 270. In some embodiments, the user interface 270 provides additional functions such as, for example, operational, diagnostic, status message display, and a visual interface that allows at least one of an installer, user, a support entity, and a service provider to perform actions with respect to the HVAC system 102. In some embodiments, the user interface 270 may be, for example, a thermostat of the HVAC system 102. In other embodiments, the user interface 270 may be associated with at least one of the plurality of environment sensors 260 to determine the environmental condition information and communicate that information to the user. The user interface 270 may also include a display, buttons, a microphone, a speaker, or other components to communicate with the user. Additionally, the user interface 270 can include a processor and memory that are configured to generate master service alarms as disclosed herein. As such, in some embodiments, the user interface 270 includes at least some of the functionality of the HVAC controller 250. In other embodiments, the user interface 270 may be, for example, a personal computer (e.g., desktop or laptop), tablet computer, mobile device (e.g., smart phone), and the like.

In a typical embodiment, the HVAC system 102 is configured to communicate with a plurality of devices such as, for example, the monitoring device 116, the communication device 118, and the like. In a typical embodiment, the monitoring device 116 is not part of the HVAC system. The monitoring device 116 is a server or computer of another party besides the user such as, for example, the manufacturer, the support entity, the service provider, and the like. In other embodiments, the monitoring device 116 may be located at an office of, for example, the manufacturer, the support entity, the service provider, and the like.

In a typical embodiment, the communication device 118 may be, for example, a non-HVAC device having a primary function that is not associated with HVAC systems. For example, non-HVAC devices include mobile computing devices that are configured to interact with HVAC systems to monitor and modify at least some of the operating parameters thereof. Mobile computing devices may be, for example, a personal computer (e.g., desktop or laptop), tablet computer, mobile device (e.g., smart phone), and the like. In a typical embodiment, the communication device 118 includes at least one processor, memory and a user interface, such as a display. One skilled in the art will also understand that the communication device 118 disclosed herein includes other components that are typically included in such devices including a power supply, communications interface, and the like. In some embodiments, the non-HVAC device may be, for example, a control console of an automobile.

The zone controller 280 is configured to manage movement of conditioned air to designated zones of the enclosed space. Each of the designated zones include at least one conditioning or demand unit such as, for example, the gas heat 220 and at least one user interface 270 such as, for example, the thermostat. The zone controlled HVAC system 102 allows the user to independently control the temperature in the designated zones. The zone controller 280 operates electronic dampers 285 to control air flow to the zones of the enclosed space.

In some embodiments, a data bus 290, which in the illustrated embodiment is a serial bus, couples the various components of the HVAC system 102 together such that data may be communicated therebetween. In a typical embodiment, the data bus 290 may include any combination of hardware, software embedded in a computer readable medium, and/or encoded logic incorporated in hardware or otherwise stored (e.g., firmware) to couple components of the HVAC system 102 to each other. As an example and not by way of limitation, the data bus 290 may include an Accelerated Graphics Port (AGP) or other graphics bus, a controller area network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, RS-485, Ethernet, or any other suitable bus or a combination of two or more of these. The data bus 290 may include any number, type, and/or configuration of buses 290, where appropriate. In particular embodiments, one or more buses 290 (which may each include an address bus and a data bus) may couple the HVAC controller 250 to other components of the HVAC system 102. In other embodiments, the connections between various components of the HVAC system 102 may be wired. For example, conventional cable and contacts may be used to couple the HVAC controller 250 to the various components. In some embodiments, a wireless connection may also be employed to provide at least some of the connections.

In a typical embodiment, the HVAC controller 250 is configured to generate a master service alarm in response to a comfort violation. The master service alarm may be, for example, a digital or analog signal designated to indicate the comfort violation. The master service alarm may be based on an existing comfort violation or a future comfort violation. Thus, master service alarms are disclosed in different embodiments that provide a diagnosis or a prognosis of the HVAC system 102.

Certain conditions may prohibit or at least reduce the possibility of the HVAC system 102 from providing the desired temperature to the user even when the HVAC system 102 is operating properly. Accordingly, the HVAC controller 250 is configured to consider anomaly conditions when generating master service alarms. As such, exemplary embodiments are disclosed that consider anomaly conditions before generating or sending the master service alarm. This prevents or at least reduces false alarms when the HVAC system 102 is working appropriately (i.e., working according to design parameters) and a service call is not needed. For example, anomaly conditions may include recent setpoint changes and operation of a defrost cycle of the HVAC system 102. In a typical embodiment, the anomaly conditions are dynamic. Thus, the HVAC system 102, the monitoring device 116, the manufacturer, or another party can determine new anomaly conditions. In some embodiments, the anomaly conditions may be determined based on historical data relative to the operation of the HVAC system 102.

In addition to generating master service alarms, the HVAC controller 250 is configured to, in some embodiments, send master service alarms to at least one of the monitoring device 116, the communication device 118, or both. In other embodiments, the master service alarm is sent to the monitoring device 116 after approval from the user. The user can enable or disable communication approval. In some embodiments, the user has the capability to control if master service alarms are automatically sent to, for example, the service provider who can initiate a service call. In other embodiments, master service alarms are automatically sent to, for example, the service provider who can initiate the service call.

In a typical embodiment, the user interface 270 is configured to provide a message in response to the master service alarm. The message may be, for example, a visual message, an audible message, and the like. In some embodiments, the user interface 270 may be an HVAC system device such as, for example, the thermostat. In other embodiments, the user interface 270 may be a non-HVAC device having a primary function that is not associated with HVAC systems. For example, non-HVAC devices include mobile computing devices that are configured to interact with HVAC systems. Mobile computing devices may be, for example, a personal computer (e.g., desktop or laptop), tablet computer, mobile device (e.g., smart phone), and the like. In some embodiments, the non-HVAC device may be, for example, the control console of an automobile.

In some embodiments, the HVAC system 102 or the HVAC controller 250 can send a message to the user interface 270 or the monitoring device 116 based on the master service alarm. The message may be, for example, a text message, a multimedia messaging service (MMS), an electronic mail (E-mail), and the like. In other embodiments the receiving device of the master service alarm is configured to generate a message itself based on the master service alarm.

Figure 3:
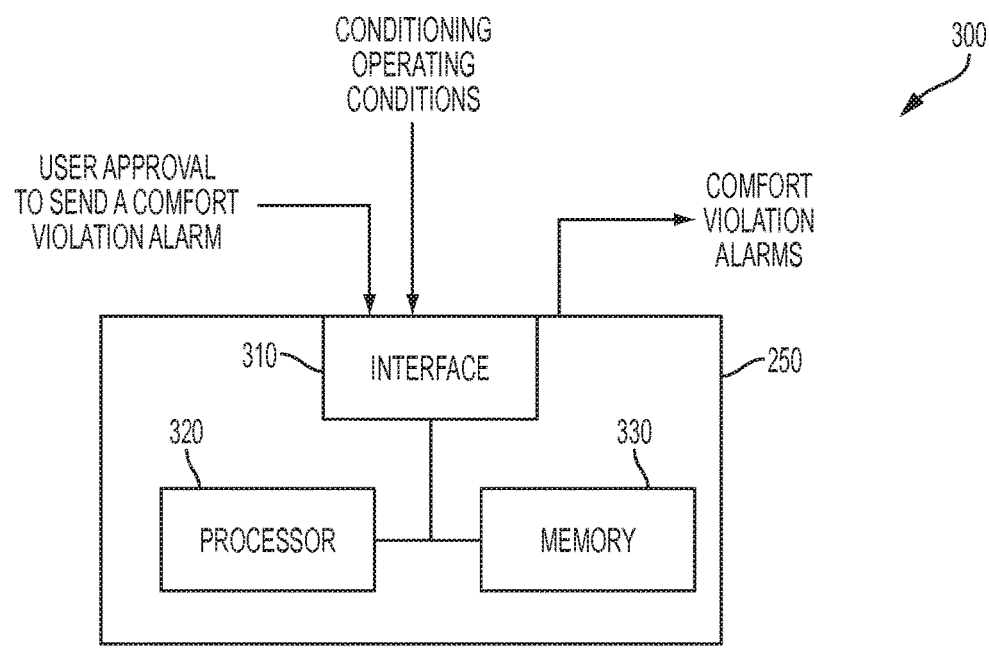
FIG. 3 is a schematic view illustrating processing circuitry of an exemplary controller of the HVAC system.

FIG. 3 is a schematic view illustrating processing circuitry 300 of the HVAC controller 250. For illustrative purposes, the processing circuitry 300 of the HVAC controller 250 will be described relative to FIGS. 1-2. In a typical embodiment, the HVAC controller 250 is configured to generate master service alarms based on the comfort violations. The HVAC controller 250 includes a communications interface 310, a processor 320, and a system memory 330. Additionally, the HVAC controller 250 may include additional components typically included within controllers for HVAC systems such as, for example, a power supply, a power port, and the like. In some embodiments, the HVAC controller 250 may be, for example, a thermostat of the HVAC system 102. While all of the components can be contained in one enclosure, in some embodiments, some of these components may be located outside the enclosure while being operatively coupled to other components. In some embodiments, the HVAC system 102 may include multiple controllers based on the structure or the number of zones of the enclosed space in which the HVAC system 102 is applied.

The communications interface 310 of the HVAC controller 250 serves as an interface between the HVAC controller 250 and other components of the HVAC system 102. In a typical embodiment, the communications interface 310 may include hardware, encoded software, or both providing one or more interfaces for communication (such as, for example, packet-based communication) among any networks, any network devices, and/or any other computer systems. As an example and not by way of limitation, the communications interface 310 may include a network-interface controller (NIC) or network adapter for communicating with an Ethernet or other wire-based network and/or a wireless NIC (WNIC) or wireless adapter for communicating with a wireless network.

Depending on the embodiment, the communications interface 310 may be any type of interface suitable for any type of network for which the HVAC system 102 is used. By way of further example, the communications interface 310 can utilize communication via various other types of wireless communication such as infrared (IR) communication, radio frequency (RF) communication, communication via direct electrical connections, etc. In general, the HVAC controller 250 may include any suitable communications interface 310 for any one or more of these networks, where appropriate.

The communications interface 310 is configured to receive indoor temperature from at least one environment sensor 260 located in the enclosed space. For example, a thermostat of the HVAC system can provide the indoor temperature to the communications interface 310. In one embodiment, the indoor temperature and control signals are communicated via the data bus 290. In some embodiments, the communications interface 310 also receives outdoor temperature. The outdoor temperature can be received from a sensor outside of the enclosed space or from an external data source that is independent of the HVAC system 102. For example, the external data source may be ACCU-WEATHER®.

In addition to the indoor temperature, the communications interface 310 is also configured to receive conditioning operating conditions of the HVAC system 102 such as, for example, a heating setpoint, a cooling setpoint, a current operating mode, a conditioning demand, and the like. In some embodiments, the communications interface 310 can receive the conditioning operating conditions from any one of the various components of the HVAC system 102 such as, for example, the thermostat.

In addition to receiving conditioning operating conditions, the communications interface 310 is also configured to transmit master service alarms. In a typical embodiment, the master service alarms may be sent to, for example, the user interface 270, the monitoring device 116, the communications device 118, and the like. In some embodiments, the master service alarms can be sent automatically or after receiving user approval. The user approval can be received via, for example, the user interface 270 associated with the HVAC system 102. The communications interface 310 is also configured to transmit control signals that represent instructions to perform services to the respective HVAC components. The control signals can instruct the various components of the HVAC system 102 to provide conditioning of air. The conditioning mode can be in response to and operate according to the received conditioning operating conditions.

The communications interface 310 is further configured to transmit the master service alarms to the monitoring device 116 via the communications network 106, described above relative to FIGS. 1-2. The communications interface 310 can transmit the master service alarms to the user interface 270 employing the communications network 106 or a data bus of the HVAC system 102 such as, for example, the data bus 290.

The processor 320 of the HVAC controller 250 directs operation of the HVAC controller 250 and instructs other HVAC components to condition air for the enclosed space. In a typical embodiment, the processor 320 may be a microprocessor, controller, or any other suitable computing device, resource, or combination of hardware, software and/or encoded logic operable to execute, either alone or in conjunction with other components. Such functionality may include providing various features discussed herein. In particular embodiments, the processor 320 may include hardware for executing instructions. As an example and not by way of limitation, to execute instructions, the processor 320 may retrieve (or fetch) instructions from an internal register, an internal cache, a storage device; decode and execute them; and then write one or more results to the internal register, the internal cache, or the storage device.

The processor 320 generates master service alarms that indicate a need for service for the HVAC system 102. In some embodiments, the processor 320 is configured to generate master service alarms based on conditioning operating conditions that are current. As such, the master service alarms provide a diagnosis of the HVAC system 102. In other embodiments, the processor 320 provides a prognosis of the HVAC system by employing historical data associated with the HVAC system 102 and the current conditioning operating conditions.

In a typical embodiment, the historical data may include, for example, operational data, attribute data, weather data, and the like. In a typical embodiment, the operational data is specific to a particular HVAC system 102 and changes either over time or due to changes by the user of the HVAC system 102. In a typical embodiment, the attribute data comprises information such as, for example, a location of the HVAC system 102, a time-zone in which the HVAC system 102 is located, and the like. In a typical embodiment, the weather data comprises weather information such as, for example, outdoor temperature, outdoor humidity, cloud cover, and the like. The weather data is received from an external data source that is independent of the HVAC system 102. For example, the external data source may be ACCU-WEATHER®.

In a typical embodiment, the historical data including, for example, the operational data, the attribute data, and the weather data is merged and passed to the processor 320 for further processing. The processor 320 is configured to utilize historical outdoor temperatures of the installed location of the HVAC system 102 along with the current conditioning operating conditions to determine how the HVAC system 102 would perform under the historical outside temperatures. The processor 320 can generate the master service alarm based on historical outdoor temperature conditions and the current conditioning operating conditions as a prognosis for the HVAC system 102.

For example, the processor 320 can determine that there are no current comfort violations in April when the outdoor temperature is a moderate 70 degrees for the installed location of the HVAC system 102. Employing the same conditioning operating conditions and a predicted outdoor temperature of 100 degrees, the processor 320 can provide a prognosis of future comfort violations for the HVAC system 102 in August. As such, a master service alarm can be generated based on a future anticipated problem with the HVAC system 102.

The processor 320 is further configured to generate master service alarms based on anomaly conditions. The anomaly conditions can be from the HVAC system itself. For example, an anomaly condition may occur due to the HVAC system 102 entering a defrost cycle or due to recent setpoint changes to the HVAC system 102. The anomaly condition may also occur due to conditions that are external to the HVAC system (i.e., external conditions).

An anomaly condition or conditions can be stored in the system memory 330 of the HVAC controller 250 during manufacturing. The system memory 330 may be any form of volatile or non-volatile memory including, without limitation, magnetic media, optical media, random access memory (RAM), read-only memory (ROM), flash memory, removable media, or any other suitable local or remote memory component or components. In particular embodiments, the system memory 330 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. The system memory 330 may store any suitable data or information, including software embedded in a computer readable medium, and/or encoded logic incorporated in hardware or otherwise stored (e.g., firmware). In particular embodiments, the system memory 330 may include main memory for storing instructions for the processor 320 to execute or data for the processor 320 to operate on.

In some embodiments, the anomaly conditions can be added to the system memory 330 after manufacturing. The anomaly conditions can be added to the HVAC controller 250 at the installed location, such as during a service call. In some embodiments, anomaly conditions or new anomaly conditions can be added via the communications network from the monitoring device 116. As such, anomaly conditions can be determined from a location remote to the HVAC system 102 and then loaded onto the HVAC controller 250 through the communications network 106 and the communications interface 310.

In addition to generating the master service alarms, the processor 320 is further configured to, in some embodiments, send the master service alarms to, for example, the user, another party, or both. In a typical embodiment, the master service alarms can be sent automatically, simultaneously, or both automatically and simultaneously. In other embodiments, the processor 320 is configured to send the master service alarm or a message based on the comfort violation, to the user interface 270 to alert the user. The message can indicate a current comfort violation or a future comfort violation. To notify another party, the processor 320 can send the master service alarm or a message based on the comfort violation, to the monitoring device 116. In other embodiments, the processor 320 is configured to transmit the master service alarm to another party based on the approval of the user. Accordingly, in some embodiments the processor 320 does not automatically notify another party, such as a service provider, until approval is received from the user. The approval can be received via the user interface 270 such as, for example, the thermostat. In other embodiments, master service alarms are automatically sent to, for example, the service provider who can initiate a service call. Additionally, the user interface 270 can be coupled to the HVAC controller 250 via the communications interface 310. As such, a user can send a transmission approval that allows a master service alarm to be sent to another party besides the user.

Figure 4:
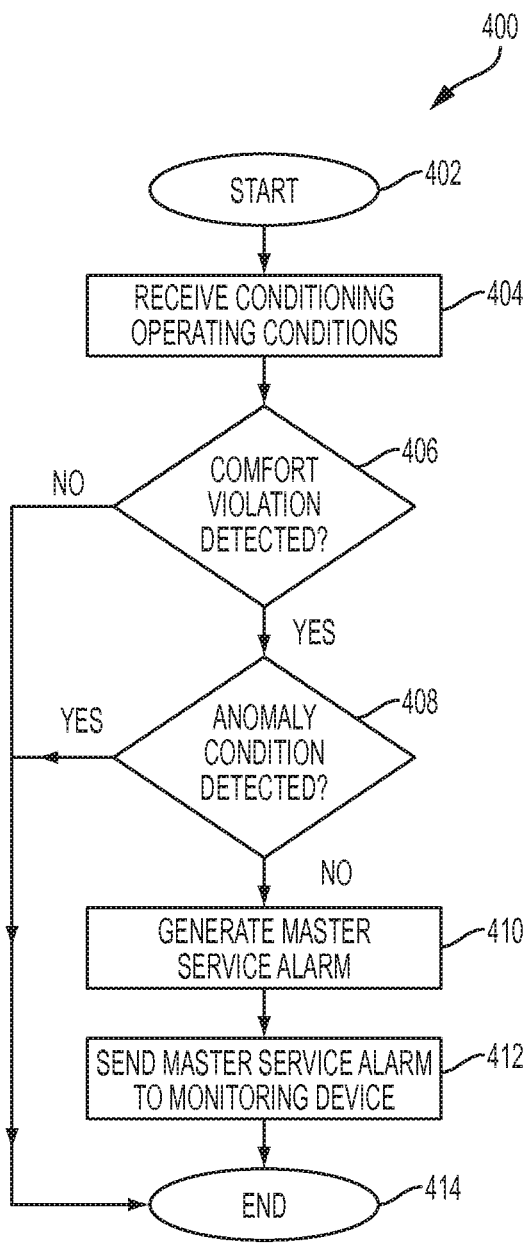
FIG. 4 is a flow chart illustrating an exemplary process for generating master service alarms.

FIG. 4 is a flow chart illustrating a process 400 for generating master service alarms. For illustrative purposes, the process 400 will be described relative to FIGS. 1-3. The process 400 starts at step 402. At step 404, the HVAC controller 250 receives the conditioning operating conditions. In some embodiments, the conditioning operating conditions can be received from the thermostat of the HVAC system 102. In other embodiments, other components of the HVAC system 102 can provide at least some of the conditioning operating conditions. The conditioning operating conditions are not service event notifications from components of the HVAC system but instead are operating conditions or states employed by the HVAC system 102 when conditioning air for an enclosed space. In some embodiments, the conditioning operating conditions may be, for example, the operating mode, the setpoint for the operating mode, the demand for the operating mode, and indoor temperatures of the enclosed space.

At step 406, the HVAC controller 250 determines whether a comfort violation exists for the HVAC system 102. If it is determined at step 406 that the comfort violation does not exist, the process 400 ends at step 414. However, if it is determined at step 406 that the comfort violation exists, the process 400 proceeds to step 408. At step 408, the HVAC controller 250 determines whether an anomaly condition exists. If it is determined at step 408 that the anomaly condition does not exist, the process 400 ends at step 414. However, if it is determined at step 408 that the anomaly condition exists, the process 400 proceeds to step 410. In a typical embodiment, the HVAC controller 250 is configured to consider anomaly conditions when generating master service alarms. As such, exemplary embodiments are disclosed that consider anomaly conditions before generating or sending a master service alarm. This prevents or at least reduces false alarms when the HVAC system 102 is working appropriately (i.e., working according to design parameters) and a service call is not needed. For example, anomaly conditions may include recent setpoint changes, operation of a defrost cycle of the HVAC system 102, and the like. At step 410, the HVAC controller 250 generates a master service alarm. At step 412 the master service alarm is sent to the monitoring device 116. In a typical embodiment, the monitoring device 116 is not part of the HVAC system 102. The monitoring device 116 is a server or computer of another party besides the user such as, for example, the manufacturer, the support entity, the service provider, and the like. From step 412, the process 400 ends at step 414.

For purposes of this patent application, the term computer-readable storage medium encompasses one or more tangible computer-readable storage media possessing structures. As an example and not by way of limitation, a computer-readable storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of the processor 320, one or more portions of the system memory 330, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of generating a master service alarm based on temperature conditions within an enclosed space conditioned by a heating, ventilation, and air conditioning (HVAC) system, the method comprising:
   receiving, by a processor of the HVAC system, information for operating the HVAC system in at least one of a cooling mode and a heating mode;
   determining, by the processor of the HVAC system from the received information, whether air temperature within the enclosed space is approaching a target temperature of the HVAC system indicative of an existing or future comfort violation of a user desired temperature setting;
   responsive to a determination that the air temperature within the enclosed space has failed to approach the target temperature, determining by the processor of the HVAC system, whether anomaly conditions exist;
   responsive to a determination that the anomaly conditions do not exist, generating, by the processor, the master service alarm indicating that the HVAC system is in need of service, wherein the master service alarm is used by the processor of the HVAC system to provide a prognosis of the HVAC system, wherein the prognosis of the HVAC system is based on historical outdoor temperature conditions and current conditioning operating conditions; and
   responsive to a determination that the anomaly conditions exist, no alarm is generated.

2. The method of claim 1, further comprising:
   responsive to a determination that the air temperature within the enclosed space is approaching the target temperature, no alarm is generated.

3. The method of claim 1, further comprising:
   forwarding the generated master service alarm to at least one communication device that is distinct from the HVAC system, wherein the at least one communication device is a non-HVAC device that is configured to interact with the HVAC system.

4. The method of claim 3, wherein the at least one communication device is a remote monitoring device associated with at least one of a manufacturer, a support entity, and a service provider.

5. The method of claim 1, wherein the anomaly conditions comprise the HVAC system entering a defrost cycle.

6. The method of claim 1, further comprising:
   receiving, by the processor of the HVAC system, historical data relative to operation of the HVAC system; and
   determining, by the processor of the HVAC system, a prognosis of the HVAC system utilizing at least one of the historical data of the HVAC system and present information of the HVAC system.

7. The method of claim 1, wherein the processor of the HVAC system comprises a communications interface for communicating with at least one server via a wireless network.

8. The method of claim 7, wherein the at least one server is associated with at least one of a manufacturer, a support entity, and a service provider.

9. The method of claim 1, further comprising:
   in response to the generated master service alarm, forwarding, by the processor of the HVAC system, a message to a user interface; and
   wherein the message comprises at least one of a text message, a multimedia messaging service (MMS), and an electronic mail (E-mail) message.

10. The method of claim 9, wherein the user interface comprises a thermostat.

11. A system comprising:
    a processor of a heating, ventilation, and air conditioning (HVAC) system;
    at least one server configured to communicate with the processor of the HVAC system via a wireless network;
    wherein the processor of the HVAC system is configured to:
        receive information for operating the HVAC system in at least one of a cooling mode and a heating mode;
        determine whether air temperature within an enclosed space is approaching a target temperature of the HVAC system indicative of an existing or future comfort violation of a user desired temperature setting;
        responsive to a determination that the air temperature within the enclosed space has failed to approach the target temperature, determine whether anomaly conditions exist;
        responsive to a determination that the anomaly conditions do not exist, generate a master service alarm indicating that the HVAC system is in need of service, wherein the master service alarm is used by the processor of the HVAC system to provide a prognosis of the HVAC system, wherein the prognosis of the HVAC system is based on historical outdoor temperature conditions and current conditioning operating conditions; and
        responsive to a determination that the anomaly conditions exist, no alarm is generated.

12. The system of claim 11, wherein responsive to a determination that the air temperature within the enclosed space has approached the target temperature, no alarm is generated.

13. The system of claim 11, wherein the processor of the HVAC system is further configured to:
forward the generated master service alarm to at least one communication device that is distinct from the HVAC system, wherein the at least one communication device is a non-HVAC device that is configured to interact with the HVAC system; and
wherein the at least one communication device is a remote monitoring device associated with at least one of a manufacturer, a support entity, and a service provider.

14. The system of claim 13, comprising:
a networking device;
wherein the networking device, the at least one communication device, and the at least one server are each communicably coupled to the wireless network; and
wherein the networking device allows the processor of the HVAC system to communicate with the at least one server.

15. The system of claim 11, wherein the processor of the HVAC system is further configured to:
receive historical data relative to operation of the HVAC system; and
determine a prognosis of the HVAC system utilizing at least one of the historical data of the HVAC system and present information of the HVAC system.

16. The system of claim 11, wherein:
in response to the generated master service alarm, the processor of the HVAC system is configured to forward a message to a user interface; and
wherein the message comprises at least one of a text message, a multimedia messaging service (MMS), and an electronic mail (E-mail) message.

17. The system of claim 11, wherein the anomaly conditions comprise the HVAC system entering a defrost cycle.

18. The system of claim 11, wherein:
the processor of the HVAC system comprises a communications interface for communicating with the at least one server via the wireless network; and
the at least one server is associated with at least one of a manufacturer, a support entity, and a service provider.

* * * * *